July 14, 1970  W. H. HART  3,520,281
WATER SYSTEM FOR FOWLS
Filed May 28, 1968  3 Sheets-Sheet 1
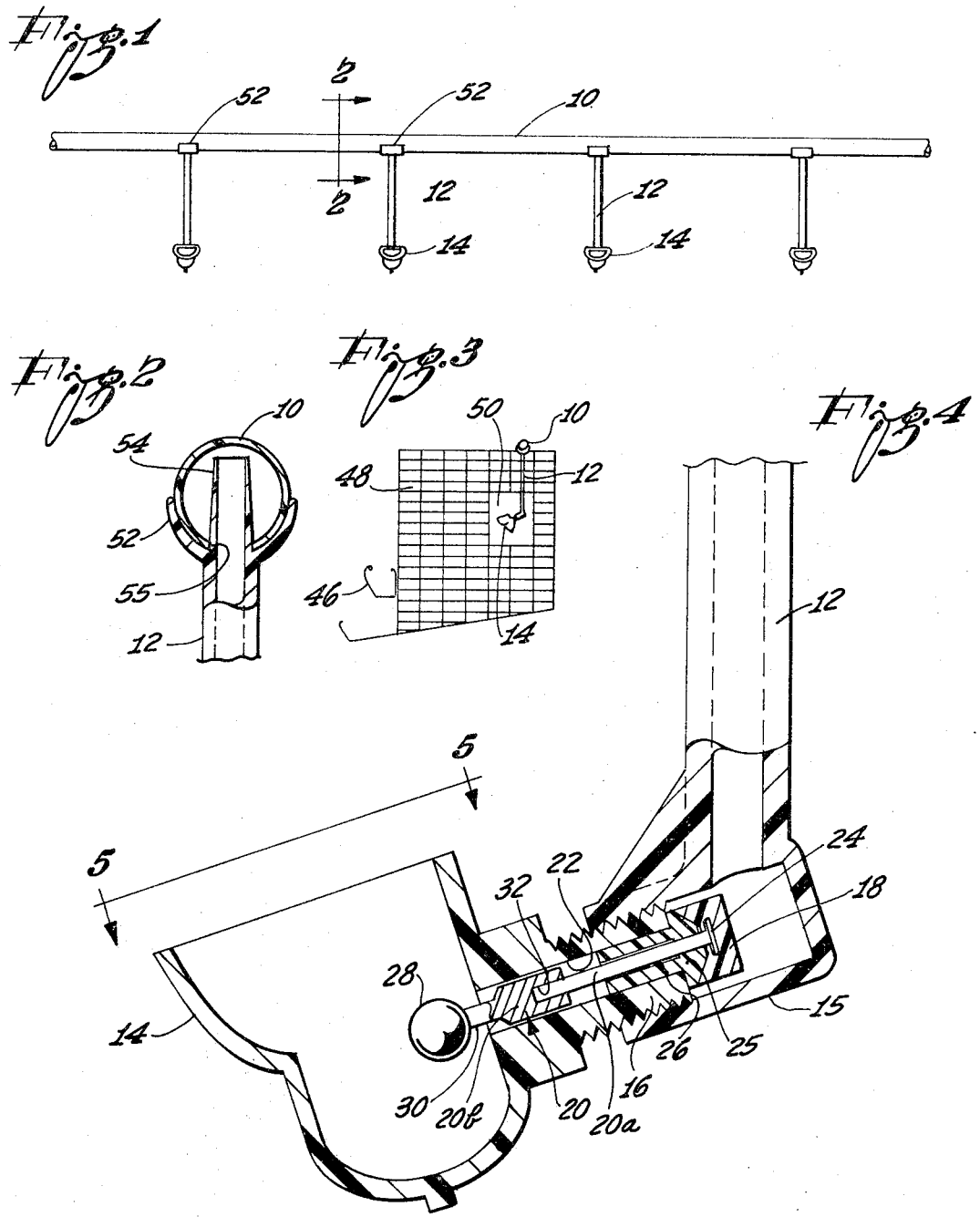
INVENTOR:
Warren H. Hart
ATTORNEYS

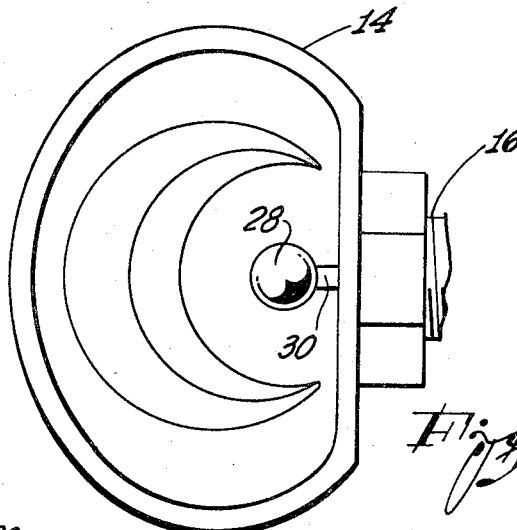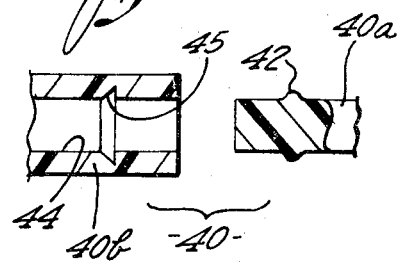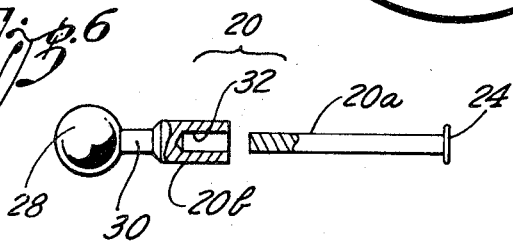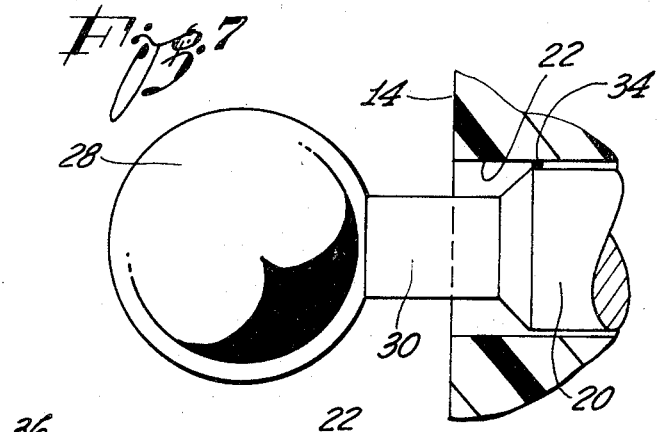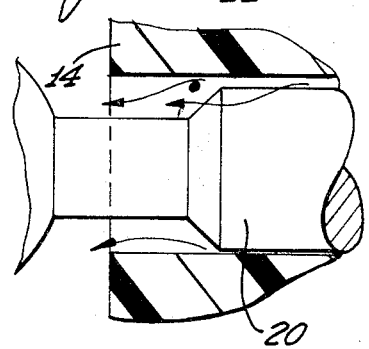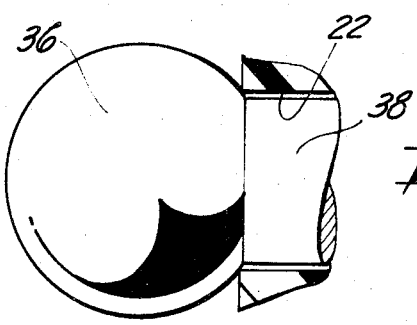

July 14, 1970 — W. H. HART — 3,520,281
WATER SYSTEM FOR FOWLS
Filed May 28, 1968 — 3 Sheets-Sheet 3
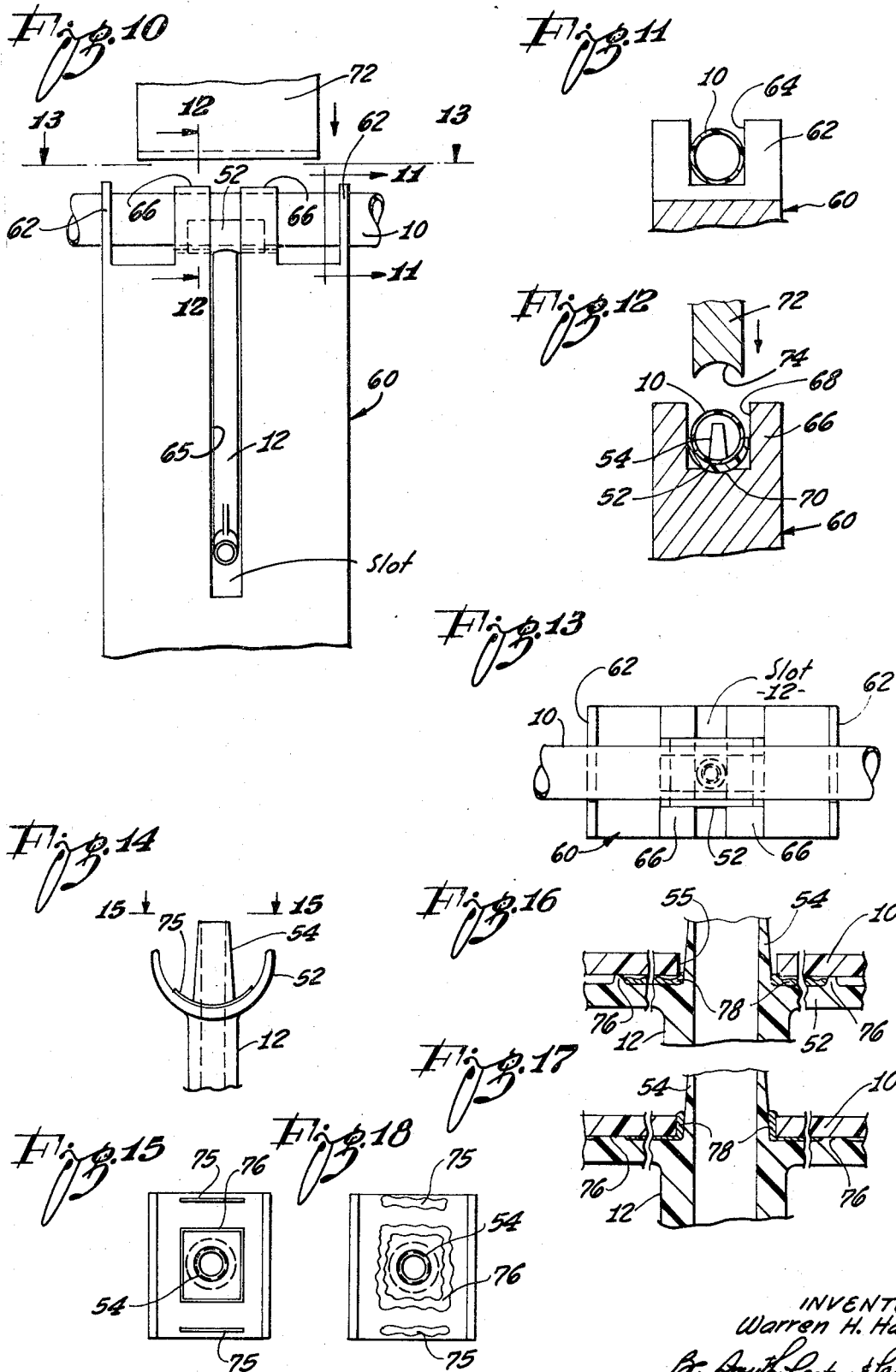
INVENTOR:
Warren H. Hart
ATTORNEYS United States Patent Office 3,520,281
Patented July 14, 1970

3,520,281
WATER SYSTEM FOR FOWLS
Warren H. Hart, Glendale, Calif., assignor to H. W. Hart Mfg. Co., Glendale, Calif., a corporation of California
Filed May 28, 1968, Ser. No. 732,695
Int. Cl. A01k 7/00
U.S. Cl. 119—75                                13 Claims

ABSTRACT OF THE DISCLOSURE

A low pressure plastic pipe to supply water for fowls has spaced outlet fittings carrying drinking cups and each fitting is joined to the supply pipe both by a cement sealant and by plastic-to-plastic fusion which is accomplished by sonic welding. Each cup has a valve member on a stem that carries a relatively large target to release water into the cup in response to a peck against the target. The stem is necked down adjacent the target so that retraction of the stem by a peck exposes the surrounding valve bore to a flushing action for removal of any food particles that may tend to jam the valve stem.

BACKGROUND OF THE INVENTION

Fowls in a row of cages are commonly supplied with drinking water by small cups, each cup having a valve with a target united therewith, the valve being normally closed by water pressure and being adapted to be momentarily opened by a peck against the target. The present invention is concerned with certain problems that arise in the construction and operation of such a water system, which problems will now be discussed.

One common difficulty arises from the fact that such a water line may be of relatively great length, for example, a length of 400 feet and since the rows of cages are on a common level the long supply pipe is usually necessarily substantially horizontal. It has been found that a substantial amount of static air may accumulate in such a long water pipe because the level of the pipe varies along its length, the accumulated air depressing the level of water in the pipe and restricting the flow to a relatively small stream in the lower region of the pipe. Too often the reduced stream is not adequate to meet the demands of all of the drinking cups along the water line.

Another difficulty resides in the fact that the feed supply for the fowls is at the front of each cage near the level of the floor of the cage and it is desirable to keep the drinking cup of the cage away from the feed supply because otherwise water splashes or drips onto the feed supply and, on the other hand, feed particles too easily fall into the drinking cups. One solution to this problem is to place the drinking cups on the rear side of the cages but this solution is not satisfactory because it is difficult to install and service a water line on the rear side of a row of cages.

Another difficulty arises from the fact that, regardless of where a drinking cup is located relative to the feed supply for a cage, articles of feed are dropped from the fowls beaks into the drinking cup and inevitably some of the particles become trapped between the valve stem and the surrounding valve bore of the drinking cup. Too often an accumulation of trapped particles causes so much friction that the valve fails to close with consequent continuous overflow of water from the drinking cup.

Still another difficulty is that the pecking target of the drinking cup valve should be large enough relative to the span of the interior of the cup to make it probable that a random peck will hit the target and, moreover, another reason for providing a relatively large target is to make it conspicuous to attract the attention of the fowls. Unfortunately, a pecking target is customarily installed through the valve bore of the cup and therefore is limited in cross section to the diameter of the valve bore. Even when the cup is reduced in cross section, a target limited by the diameter of the valve bore is too small relative to the interior span of the cup and is also somewhat inconspicuous.

Further difficulties arise in the fabrication of plastic pipe with threaded outlet fittings for the drinking cups. To provide a plastic pipe with such fittings, the pipe is formed with spaced radial bores on its underside and each fitting is formed with a cylindrically curved cradle that fits snugly against the underside of the pipe. To center a cradle with respect to the pipe aperture, the fitting is customarily formed with a short nipple portion to engage the pipe aperture, the length of the nipple being substantially equal to the thickness of the wall of the pipe.

To assemble a fitting to the pipe, the cradle of the fitting is coated with a layer of fluent quick-curing cement and the parts are clamped together until the cement cures to bond the fitting to the pipe with a fluid-tight joint. The assembly of several fittings to a twenty foot plastic pipe with the fittings spaced apart by only a few inches requires the application of a corresponding number of clamps to hold the cradles against the supply pipe until the cement cures and even with the fastest curing cement the clamps must be kept in place at least three minutes to be sure that the joints are bonded well enough to permit further handling of the pipe. The need is for a fabrication procedure that does not require the application and removal of clamps and the temporary storage of the assemblies until the cement hardens.

SUMMARY OF THE INVENTION

The problem of preventing excessive accumulation of air in the supply pipe with consequent restriction of the flow capacity of the pipe is solved simply by extending the length of the nipple portions of the outlet fittings. With the nipple portion of each outlet fitting extending upward into the supply pipe to within approximately ⅛" from the upper wall of the pipe, the nipple functions in effect as an interior stand pipe. If there is any tendency for air to accumulate, the volume of the trapped air is limited to the ⅛" clearance at the upper end of the nipple, any additional air being vented to the drinking cups. As a consequence trapped air can have no significant effect on the flow capacity of the supply pipe.

The problem of providing an adequate distance between the drinking cup and the feed supply at each cage without complicating the installations and maintenance of the pipe line is met by laying the pipe line at a convenient location on the top of a row of cages and mounting the drinking cups on outlet fittings that are, in effect, branch pipes and extend downwardly from the pipe line. In this regard a feature of the invention is the concept of extending each fitting or branch pipe downward in the plane of partition between two cage compartments, the material of the partition being cut away to clear the drinking cup. The provision of a single drinking cup for two cage compartments reduces the number of drinking cups and space is saved because each drinking cup extends only partially into a cage compartment.

The problem of increasing the size of the pecking target of a drinking cup valve is solved by a new fabrication procedure which avoids the necessity of inserting the target through the valve bore and therefore permits the use of a ball shaped target of substantially greater diameter than the valve bore. The valve stem is made in two longitudinal sections, one carrying the valve head and the other carrying the oversized pecking target, the two sections being designed to unite in response to axial force. For example the inner end of one stem section may be dimensioned for forced fit into a socket on the inner end of the other stem section. The stem section that carries the oversized target is inserted into the valve bore from the interior of the cup and then the two stem sections are forced into mutual permanent engagement.

The failure of a drinking cup valve to close because of trapped feed particles adjacent the valve stem is eliminated by a certain provision and in the preferred practice of the invention this provision is reinforced by two additional factors. The certain provision is simply to form the valve stem with a neck of reduced diameter which is at the outlet end of the valve bore and is retracted into the bore when the valve is opened by the impact of a peck against the target. Particles of feed are initially trapped between the valve stem and the surrounding wall of the valve bore near the outlet end of the valve bore but the periodic retraction of the necked down portion of the valve stem into the region where the feed particles are trapped results in a flushing action to clear the trapped particles from the valve bore. The two additional reinforcing factors in the preferred practice of the invention are, first, the downward sloping of the valve bore towards the interior of the cup to cause gravity as well as water pressure to urge the valve to closed position and, second, the added weight of the oversized target to increase the gravity effect.

The problem of simplifying the assembly of an outlet fitting to a water pipe is accomplished by employing sonic welding to fuse together portions of the fitting and the pipe to hod the two parts together until the cement sealant cures. Sonic welding cannot be dependent upon to form a fluid tight joint but sonic welding can replace the use of clamps to hold the parts together during the curing period.

Sonic welding of two plastic parts requires the provision of what is termed energy directors to localize the sonic vibrations to concentrate the sonic energy on a relatively small portion of the plastic to bring the small portion quickly to its melting temperature for the required fusion. In this regard a feature of the invention is the concept of providing energy directors in the form of small narrow ridges or ribs. Thus in preparation for the sonic welding of a cradle of a fitting to the underside of a plastic pipe, the cradle is preformed with small energy director ridges that quickly melt when sonic energy is applied.

In the preferred practice of the invention the energy director ridges serve as dam elements to confine the fluent cement. By providing a continuous energy director ridge that surrounds an area of the cradle that is coated with the fluent cement, the resultant fusion of the plastic along the line of the continuous ridge effectively entraps the fluent cement to confine the fluent cement until the cement is cured. Thus the sonic welding not only serves as means to hold the fittings and the pipe together to eliminate the use of clamps but also serves as means to control the spreading of the fluent cement to insure that each joint is in fact fluid tight. It can be readily appreciated that the use of sonic welding in this manner not only eliminates the need for temporary clamps but also eliminates the need for temporary storage of the parts in process to permit the cement to cure.

The features and advantages of the invention may be understood from the following detailed description and the accompanying drawings.

BRIEF DESCRIPTION OF THE DRAWINGS

In the drawings, which are to be regarded as merely illustrative:

FIG. 1 is a side elevational view of a portion of a water supply pipe with a series of outlet fittings in the form of branch pipes depending therefrom and with drinking cups mounted on the lower ends of the fittings;

FIG. 2 is an enlarged cross section along the line 2—2 of FIG. 1 showing how a nipple portion of a fitting extends upward into the interior of the pipe;

FIG. 3 is an elevational view showing how a fitting may extend downward from a supply pipe that extends across the top of a row of cages, the fitting being located at a partition between two cage compartments with the partition cut away to provide clearance for the drinking cup;

FIG. 4 is an enlarged sectional view showing a cup on the lower end of a fitting;

FIG. 5 is a plan view of the drinking cup as seen along the line 5—5 of FIG. 4;

FIG. 6 is a view partly in side elevation and partly in section showing how a valve stem with an oversized ball-shaped target may be made in two sections;

FIG. 7 is an enlarged fragmentary section showing the normal position of a ball-shaped target relative to the valve bore;

FIG. 8 is a view similar to FIG. 7 showing the valve stem at a position to which it is retracted by a peck against the ball-shaped target;

FIG. 8a is a view similar to FIG. 8 showing a valve stem that is not necked down adjacent the ball shaped target;

FIG. 9 is a greatly enlarged fragmentary sectional view showing how two sections of a valve stem made of plastic material may be designed for mutual engagement;

FIG. 10 is a fragmentary elevational view showing a portion of a pipe together with an outlet fitting positioned in a support fixture in preparation for a sonic welding operation;

FIG. 11 is a section along the line 11—11 of FIG. 10 showing how the fixture confines the pipe;

FIG. 12 is a section along the line 12—12 of FIG. 10 showing how the fixture confines the cradle of the outlet fitting against the underside of the pipe, the figure further showing the horn of the sonic welder poised above the pipe;

FIG. 13 is a plan view of the fixture together with the pipe and outlet fitting as seen along the line 13—13 of FIG. 10;

FIG. 14 is a view of the upper end of an outlet fitting showing the cradle in end elevation;

FIG. 15 is a plan view of the upper end of the fitting as seen along the line 15—15 of FIG. 14;

FIG. 16 is an enlarged diagrammatic sectional view showing how the energy director ridges serve as dams for the fluent cement prior to the welding operation;

FIG. 17 is a similar view to show the effect of the welding operation in the melting of the energy director ridges, and FIG. 18 is a view similar to FIG. 15 showing the melted energy director ridges.

DESCRIPTION OF THE PREFERRED PRACTICES OF THE INVENTION

Referring first to FIGS. 1 and 3, a water supply pipe 10 made of a suitable plastic, preferably PVC, is provided at spaced points with outlet fittings 12 which may be relatively short to place the corresponding drinking cups 14 close to the level of the supply pipe, but in this instance the outlet fittings are relatively long fittings that serve as downwardly extending branches of the supply pipe. Each of the outlet fittings 12 has a downwardly inclined portion 15 at its lower end which is internally screw threaded to receive a threaded nipple portion 16 of the corresponding drinking cup 14. The lower end portion 15 of the fitting 12 cooperates with the nipple portion 16 of the drinking cup to form a valve chamber in which a soft elastomeric valve head 18 is mounted on a valve stem, generally designated 20, that is slidingly mounted in a valve bore 22 of the cup.

In the construction shown, the valve stem 20 is formed with a radial end flange 24 which retains the soft elastomeric valve head 18. The valve head 18 has a forward concave face to cooperate with a conical valve seat 25, the valve seat being a portion of a bushing 26 that fits snugly into the valve bore 22. It is apparent that water pressure will tend to hold the valve head 18 in its closed position against the valve seat 25 and that by virtue of the downward inclination of the valve bore 22 gravity will also tend to keep the valve closed.

The valve stem 20 is made in two separate sections that are shown in FIG. 6, namely, a rearward section 20a in the form of a pin that slidingly extends through the valve bushing 26 with clearance for water flow and a forward section 20b which has an enlarged guide portion small enough in diameter to permit water flow through the valve bore but large enough in diameter to cooperate with the valve bore for guiding the valve stem and for maintaining the valve stem substantially coaxial with the valve bore. Integral with the forward stem section 20b is a ball-shaped target 28 inside the cup 14, the forward stem section being reduced in diameter to form a relatively slender neck 30 on the rear side of the target.

In the construction shown, the pin shaped rear stem section 20a is dimensioned for forced fit in a socket 32 of the forward stem section 20b. Prior to the installation of the drinking cup 14 on the outlet fitting 12, the bushing 26 carrying the valve seat 25 may be installed in the nipple portion of the drinking cup and the pin shaped rearward stem section 20a may be inserted into the valve bore 22. The forward stem section 20b is then inserted into the valve bore from the interior of the drinking cup 14 and the two stem sections are then forced together axially for permanent mutual engagement of the two sections. The soft elastomeric valve head 18 may then be mounted on the rear end of the valve stem. This fabrication procedure makes possible the relatively large diameter of the ball-shaped target 28, the target being substantially oversized in relation to the diameter of the valve bore 22.

FIG. 2 shows the valve stem at the normal closed position of the valve and FIG. 8 shows the valve stem retracted to open position by the impact of a peck against the target 28. It has been found that while the valve is at its normal closed position any particles of feed that may enter the valve bore 22 tend to accumulate between the guide portion of the valve stem and the surrounding surface of the valve bore 22 at the forward or downstream end of the guide portion of the stem. By way of example, a particle 34 of feed is shown in FIG. 7 near the forward end of the enlarged guiding portion of the valved stem 20.

When the valve stem is retracted to open position by the impact of a peck against the forward hemisphere of the target 28, the neck 30 of the valve stem is retracted into the region of the trapped feed particle 34 with two results. One result is that the feed particle is released from close confinement between the valve stem and the valve bore and the other result is that the released feed particle is subjected to a flushing action as an increment of water flows through the valve bore into the cup. Thus each time a bird pecks the forward hemisphere of the target 28 the vulnerable portion of the valve bore is flushed out to avoid progressive accumulation of feed particles.

The importance of providing a neck 30 that is substantially smaller in diameter than the valve bore 22 may be understood by referring to FIG. 8a where a ball-shaped target 36 is mounted on a valve stem 38 that is not reduced in diameter to form a neck. When the valve stem 38 is retracted by the impact of a peck against the forward hemisphere of the target 36 any food particles that are confined between the valve stem and the surrounding valve bore 22 continue to be confined. To make matters worse, if the target 36 is driven back against the entrance to the valve bore 22 as shown in FIG. 8a the rear side of the ball shaped target may actually drive new food particles into the valve bore.

If desired, the valve stem may be made of a suitable plastic, for example polypropelene. FIG. 9 shows how a valve stem 40 may comprise a rearward section 40a and a forward section 40b. The rearward stem section 40a is formed with a pair of diametrically opposite radial projections 42 and the forward stem section 40b forms a socket 44 having an inner circumferential recess 45 dimensioned for engagement by the projections 42 when the two stem sections are forced together axially.

In this particular example of the water system, the supply pipe 10 is mounted on the upper side of a row of cages and a feed trough 46 is provided on the front of the row of cages. Each of the fittings 12 extends downward at a wire partition 48 between two cage compartments and the partition is cut away to provide a window 50 in which the drinking cup 14 is placed for use jointly by the two fowls in the two compartments on the opposite sides of the partition. It is to be noted that this arrangement places the water cup 14 at a sufficient distance from the feed trough 46 to minimize the splashing of water from the drinking cup into the feed trough and to minimize the scattering of feed from the feed trough into the drinking cup.

As indicated in FIGS. 1 and 2, the upper end of each outlet fitting 12 is formed with a cylindrically curved cradle 52 that fits snugly against the underside of the supply pipe 10. As indicated in FIG. 2 a nipple portion 54 of the fitting 12 extends above the cradle 52 and extends through a radial aperture 55 on the underside of the supply pipe 10. In this embodiment of the invention the inside diameter of the pipe 10 is $1\frac{1}{16}''$ and the nipple portion 54 of the fitting 12 terminates at approximately $\frac{1}{8}''$ from the upper wall of the supply pipe. If air accumulates inside the supply pipe 10 sufficiently to depress the water level below the upper end of the nipple 54 air will be displaced downward through the firing 12 into the corresponding drinking cup 14 whenever the valve of the drinking cup is opened by the pecking action of a fowl. Thus the provision of the upwardly extending nipple portion 54 of the fitting inside the supply pipe 10 solves the problem of avoiding excessive accumulation of air in the supply pipe.

The preferred method of assembling the fittings 12 to a 20 foot length of the supply pipe 10 may be understood by referring to FIGS. 10–18.

FIG. 10 shows a fixture, generally designated 60, designed to support a portion of a length of water pipe 10 and to support a cradle 52 of a fitting 12 with the nipple portion 54 of the fitting extending through a bottom opening 55 in the pipe 10 as indicated in FIG. 2. The fixture 60 has two opposite side flanges 62 which, as shown in FIG. 11 are formed with rectangular recesses 64 to confine and support the water pipe 10. The fixture 60 has a vertical slot 65 to accommodate the fitting 12 and on opposite sides of the upper end of the slot, the fixture has two relatively wide flanges 66 to support opposite end portions of the cradle 52 of the fitting. As shown in FIG. 12 each of the flanges 66 has a recess 68 to confine the cradle 52 against the underside of the pipe 10, the lower portion of the recess being rounded as indicated at 70 to nest the underside of the cradle.

Poised above the support fixture 60 is the lower end of a horn 72 of a sonic welder, the leading end of the horn being formed with a cylindrically curved surface 74 as indicated in FIG. 12 to mate with the upper exterior surface of the pipe 10. The sonic welder may be of the type manufactured by Branson Sonic Power Co., Danbury, Conn.

When the horn 72 is lowered against the plastic pipe 10 under pneumatic pressure, a suitable degree of pressure is created across the interface between the cradle 52 and the underside of the pipe 10 and while the parts are under pressure a sonic generator (not shown) of the sonic welder vibrates the horn 72 at an appropriate frequency, for example, at 20,000 c.p.s.

The cradle 52 is shaped with suitable energy directors which may be in the form of narrow ridges or ribs. Preferably, as shown in plan in FIG. 15, two transverse energy director ridges 75 are provided near opposite ends of the cradle 52 and a continuous rectangular energy director ridge 76 surrounds the base of the upwardly extending nipple 54 of the fitting 12. Before the fitting 12 is placed on the support fixture 60 a suitable applicator is employed to deposit a layer of fluent uncured cement across the entire concave face of the cradle. A suitable cement for this purpose is quick setting glue No. 710 supplied by Industrial Poly Chemical Co., Gardena, Calif. Such a cement will cure at room temperature in approximately two minutes.

FIG. 16 is a cross section of the interface between the cradle 52 and the bottom wall of the pipe 10 just prior to the sonic welding operation. FIG. 16 shows how the nipple portion 54 of the fitting 12 extends through the corresponding bottom opening 55 in the pipe 10 to center the yoke 52 relative to the bottom opening. It is to be noted in FIG. 16 that the continuous rectangular energy director 76 serves as a dam to confine the portion of the fluent cement 78 that surrounds the bottom opening 55 of the plastic pipe.

When sonic energy is applied while the parts are under pressure, the vibratory energy is concentrated at the energy director ridges with the consequence that the energy director ridges are quickly brought up to the melting point of the plastic material. As a consequence the plastic material of the cradle 52 and the plastic material of the pipe 10 fuse together in the regions of the energy director ridges. FIGS. 17 and 18 indicate that the rectangular energy director ridge 76 is greatly flattened by the sonic welding operation and in practice the energy director ridge usually completely disappears. It is apparent that the fusing together of the two plastic materials in a continuous zone around the bottom opening 55 of the pipe as indicated in FIG. 18 completely traps the fluent cement 78 in this region.

The fusion of the cradle with the plastic pipe makes the joint between the fitting 12 and the plastic pipe sufficiently strong to permit a twenty foot length of the plastic pipe with the fittings 12 assembled hereto to be freely handled without waiting for the cement to cure. Thus the use of the sonic welding makes it unnecessary to employ clamps to hold the pipe together while the cement cures.

My description in specific detail of the preferred practice of the invention will suggest various changes, substitutions and other departures from my disclosure within the spirit and scope of the appended claims.

What is claimed is:

1. In a device of the character described for supplying water to fowls from a low pressure pipeline, the combination of:
   a nipple having an axial bore and having an external screw thread to screw into a fitting connected to a water supply and to form with the fitting a valve chamber at the inlet end of the nipple;
   a watering cup united with the nipple for support thereby;
   a valve stem slidingly extending through the axial bore of the nipple with clearance for water flow through the bore from the valve chamber to the cup; and
   a head on the inner end of the stem to close the inlet end of the axial bore under pressure from the water supply,
   said stem having a guide portion at the outlet end of the bore of sufficient diameter and length to cooperate with the circumferential wall of the bore to keep the valve stem substantially concentric to the bore,
   said stem extending into the interior of the cup and having an end enlargement in the cup to serve as a target to be pecked by the fowls, the end surface of the enlargement being rounded for retraction of the stem by cam action by glancing impact of the beaks of the fowls against the end surface,
   said enlargement being of substantially greater cross dimension than the axial bore to serve three purposes, first, to provide a relatively large cam surface to favor opening of the valve by cam action, second, to make the target conspicuous to the fowls, and third, to reduce the clearance in the cup around the target for increased probability of impact against the cam surface by random pecks,
   said stem being of substantially smaller diameter than the axial bore in the region immediately adjacent the enlargement to provide a reduced neck portion connecting the target to the guide portion of the stem to cause flushing of the outer end of the axial bore in response to retraction of the neck portion of the stem into the axial bore by the impact of pecks against the target,
   said stem being made in two separate longitudinal sections shaped and dimensioned for interconnection with the length of the longitudinal section at the target end of the stem less than the cross dimension of the interior of the cup to permit said section to be introduced into the axial bore from the interior of the cup for the purpose of assembling the two longitudinal sections together.

2. A combination as set forth in claim 1 in which said axial bore inclines downwardly towards the interior of the cup whereby said stem tends to gravitate towards the closed position of the valve.

3. In a drinking water system for fowls, the combination of:
   a water pipe to extend along a row of cages that confine the fowls;
   a plurality of outlet fittings mounted on the underside of the water pipe and spaced along the water pipe;
   drinking cups mounted on said fittings respectively, each of said drinking cups having a normally closed valve with a target connected to the valve to release water into the cup in response to pecks by the fowls against the target; and
   a nipple extending upward from each fitting into the interior of the water pipe to a level near the upper wall of the water pipe to vent air from the interior of the water pipe to the interior of the corresponding drinking cup.

4. A combination as set forth in claim 3 in which each of said valves includes a valve head on a stem that is slidingly mounted in a bore from the fitting to the interior of the cup;
   in which said stem and valve head are normally urged towards the cup to a closed position by the pressure of the water in the fitting; and
   in which said bore is inclined downward towards the cup to enable gravity to assist the closing movement of the valve stem and valve head.

5. In a drinking water system for fowls in a row of cages, the combination of:
   a water supply pipe;
   a plurality of outlet fittings spaced along the bottom side of the water pipe;
   drinking cups mounted on the outlet fittings respectively, each of said drinking cups having a normally closed valve with a target connected to the valve to release water into the cup in response to pecks by the fowls against the target;
   an upwardly extending nipple inside the water pipe at each outlet fitting with the upper end of the nipple near the upper wall of the water pipe,
   said nipple being integral with the outlet fitting and extending through a radial aperture on the underside of the water pipe to release air from the water pipe to the corresponding drinking cup; and
   a cradle integral with the fitting and bonded to the underside of the water pipe around said radial aperture.

6. A combination as set forth in claim 5 in which the cradle is both fused and adhesively bonded to the underside of the water pipe in a zone surrounding the base of the nipple.

7. A combination as set forth in claim 5 in which a portion of the cradle surrounding the base of the nipple is adhesively bonded to the underside of the water pipe and in which the cradle is fused to the underside of the water pipe in a continuous zone that encloses said portion of the cradle.

8. In a drinking water system for fowls in a row of cages, the combination of:
   a water pipe extending along the row of cages at a level substantially above the floors of the cages;
   a plurality of branch pipes spaced along the water pipe and extending downward from the water pipe;
   drinking cups mounted on the lower ends of the branch pipes respectively, each of said drinking cups having a normally closed valve with a target connected to the valve to release water into the cup in response to pecks by the fowls against the target;
   nipples inside the water pipe integral the upper ends of the branch pipe respectively with the upper ends of the nipples near the upper wall of the water pipe;
   cradles integral with the branch pipes, respectively, abutting the bottom side of the water pipe,
   said water pipe and said branch pipes being made of plastic; and
   a layer of adhesive sealing material interposed between each cradle and the underside of the water pipe in a zone that surrounds the corresponding nipple to seal the joint between the branch pipe and the water pipe, said cradle being fused to the water pipe on opposite sides of said zone.

9. A combination as set forth in claim 8 in which said water pipe extends along the top side of the cages; and in which each of most of the cups is in a window in a partition between two cages for use by fowls in the two cages.

10. A method of fabricating a joint between a plastic pipe and a plastic outlet fitting, including the steps of:
   forming a radial aperture in the wall of the plastic pipe;
   providing the outlet fitting with a cradle to fit against the outer surface of the plastic pipe around said aperture;
   forming energy director ridges on one of said pipe and said cradle on opposite sides of said aperture with the ridges spaced from the aperture;
   spreading a fluent curable adhesive sealant on one of said pipe and said cradle in the region where the cradle fits against the pipe;
   seating said cradle against the pipe to confine the sealant between the cradle and the pipe;
   creating pressure between the pipe and the cradle; and
   subjecting the pipe and the cradle to sonic energy while they are under pressure to melt the ridge to fuse the cradle to the pipe to hold the cradle in place until the sealant cures.

11. A method as set forth in claim 10 which includes the step of forming a continuous energy director ridge on one of said pipe and cradle with the continuous ridge surrounding said aperture to confine the fluent sealant immediately adjacent the aperture until the sealant cures.

12. A method of fabricating a joint between a plastic pipe and a plastic outlet fitting, including the steps of:
   forming a radial aperture in the wall of the plastic pipe;
   providing the outlet fitting with a cradle to fit against the outer surface of the plastic pipe around said aperture;
   forming said cradle with a nipple centrally thereof to engage said aperture to hold the nipple in a predetermined position relative to the aperture;
   forming said cradle with energy director ridges spaced from the nipple on opposite sides thereof to abut the underside of the pipe;
   applying fluent uncured sealant to one of said pipe and said cradle in the region of the mating surfaces of the pipe and cradle including the region around the nipple;
   placing said cradle against the pipe with the nipple engaging the aperture of the pipe;
   creating pressure between the mating surfaces of the pipe and cradle with the pressure concentrated at the energy director ridges;
   subjecting the pipe and the cradle to sonic vibration while they are under pressure to heat said energy director ridges to their melting point to fuse the cradle to the pipe; and
   removing the pressure from the pipe and cradle before the sealant cures whereby the fusion between the cradle and the pipe holds the outlet fitting in its assembled position until the sealant cures.

13. A method as set forth in claim 12 in which the energy director ridges are continuous around the nipple to enclose the sealant that is adjacent the nipple.

References Cited

UNITED STATES PATENTS

| | | | |
|---|---|---|---|
| 2,319,928 | 5/1943 | Hart | 119—75 |
| 3,353,518 | 11/1967 | Hart | 119—75 |

HUGH R. CHAMBLEE, Primary Examiner